(12) United States Patent  
Kim et al.

(10) Patent No.: US 10,440,557 B2  
(45) Date of Patent: Oct. 8, 2019

(54) ELECTRONIC DEVICE FOR PROVIDING SERVICE USING SECURE ELEMENT AND METHOD THEREOF

(71) Applicant: Samsung Electronics Co., Ltd., Suwon-si, Gyeonggi-do (KR)

(72) Inventors: Sung Oh Kim, Incheon (KR); Jeong Don Kang, Suwon-si (KR); Hyun Ry Kim, Yongin-si (KR); You Cheol Moon, Suwon-si (KR); Sang Soo Lee, Suwon-si (KR); Sang Hwi Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/908,643

(22) Filed: Feb. 28, 2018

(65) Prior Publication Data

US 2018/0249322 A1    Aug. 30, 2018

(30) Foreign Application Priority Data

Feb. 28, 2017 (KR) .................. 10-2017-0026295

(51) Int. Cl.
| | |
|---|---|
| *H04W 8/20* | (2009.01) |
| *H04W 8/18* | (2009.01) |
| *H04L 29/06* | (2006.01) |
| *H04W 12/06* | (2009.01) |
| *H04W 12/08* | (2009.01) |
| *H04W 88/06* | (2009.01) |

(52) U.S. Cl.
CPC .......... *H04W 8/183* (2013.01); *H04L 63/0853* (2013.01); *H04L 63/105* (2013.01); *H04W 12/06* (2013.01); *H04W 12/08* (2013.01); *H04W 88/06* (2013.01)

(58) Field of Classification Search
CPC ............................... H04W 8/20; H04W 8/183
See application file for complete search history.

(56) References Cited

U.S. PATENT DOCUMENTS

| 8,577,337 B2 | 11/2013 | O'Leary |
| 8,868,041 B2 | 10/2014 | O'Leary |
| 9,414,220 B2 | 8/2016 | Lee et al. |
| 9,451,098 B2 | 9/2016 | Zhu et al. |
| 9,485,252 B2 | 11/2016 | Wane |
| 9,860,740 B2 | 1/2018 | Wane |

(Continued)

FOREIGN PATENT DOCUMENTS

| WO | 2013/066077 A1 | 5/2013 |
| WO | 2016/201398 A1 | 12/2016 |

OTHER PUBLICATIONS

International Search Report dated Jun. 15, 2018 in connection with International Patent Application No. PCT/KR2018/002481.

*Primary Examiner* — Myron Wyche

(57) ABSTRACT

An electronic device includes a housing, a display including a touch screen exposed through a part of the housing, a communication circuit supporting cellular communication, a secure element storing a plurality of profiles including a first profile associated with a first cellular network and a second profile associated with a second cellular network, at least one processor electrically connected to the display, the communication circuit, and the secure element, and a memory electrically connected or coupled to the processor.

19 Claims, 13 Drawing Sheets

(56) References Cited

U.S. PATENT DOCUMENTS

| | | |
|---|---|---|
| 2013/0023309 A1 | 1/2013 | Holtmanns et al. |
| 2013/0231087 A1 | 9/2013 | O'Leary |
| 2014/0038563 A1 | 2/2014 | O'Leary |
| 2014/0220952 A1 | 8/2014 | Holtmanns et al. |
| 2014/0237101 A1* | 8/2014 | Park .................. H04W 8/20 |
| 2015/0281964 A1 | 10/2015 | Seo et al. |
| 2015/0304506 A1 | 10/2015 | Zhu et al. |
| 2016/0007188 A1 | 1/2016 | Wane |
| 2016/0007190 A1 | 1/2016 | Wane |
| 2016/0134318 A1 | 5/2016 | Wane |
| 2016/0173156 A1 | 6/2016 | Wane |
| 2016/0173493 A1 | 6/2016 | Wane |
| 2017/0026826 A1 | 1/2017 | Wane |
| 2017/0164184 A1* | 6/2017 | Borse .................. H04W 8/183 |

* cited by examiner

701

○ Multi Enable

○ Enable

| YES | NO |

FIG.7

ELECTRONIC DEVICE FOR PROVIDING SERVICE USING SECURE ELEMENT AND METHOD THEREOF

CROSS-REFERENCE TO RELATED APPLICATION

This application is based on and claims priority under 35 U.S.C. § 119 to Korean Patent Application No. 10-2017-0026295, filed on Feb. 28, 2017, in the Korean Intellectual Property Office, the disclosure of which is incorporated by reference herein its entirety.

TECHNICAL FIELD

The present disclosure relates to a secure element embedded in an electronic device.

BACKGROUND

A secure element is a fundamental element for secure transaction and security maintenance in an electronic device. For example, the secure element may be implemented, for example, in the form removable from the electronic device or embedded in the electronic device. For example, the secure element may be a universal integrated circuit card (UICC) or an embedded UICC (eUICC).

The UICC is a smart card capable of operating as a module for user authentication in the electronic device. Depending on a communication scheme, the UICC may be referred to as a "subscriber identity module (SIM) card" or a "universal SIM (USIM) card". The electronic devices equipped with two or more UICCs are available in markets such as China or Central and South America. As such, the electronic devices equipped with two or more UICCs may support a dual SIM and dual standby (DSDS) function, a dual SIM and dual active (DSDA) function, or a communication function using a plurality of SIMs. The electronic device using a plurality of physical SIM cards may support a multi-profile for simultaneously performing communication associated with several profiles.

Since the eUICC is embedded in the electronic device, the eUICC may be implemented in a form not capable of being removable. The eUICC may download and use profiles in the over the air (OTA) scheme for the purpose of receiving the mobile communication service of a mobile network operator (MNO). The user may select and utilize a profile, which the user desires, from among a plurality of profiles of the eUICC.

The above information is presented as background information only to assist with an understanding of the present disclosure. No determination has been made, and no assertion is made, as to whether any of the above might be applicable as prior art with regard to the present disclosure.

SUMMARY

According to the standard document such as global system for mobile communication association (GSMA) "SGP. 22-RSP spec version 2.0" or the like, even though a plurality of profiles are installed in the eUICC, the eUICC may enable only one profile. In the standard document, an issuer security domain profile (ISD-P) may host only one profile, and in the case where the eUICC enables a specific profile, other profile(s), which has been previously enabled, is defined to be disabled. The eUICC may enable only one ISD-P (or one profile) at the same time.

In the case where a user utilizes a communication network in other countries other than a country where a user lives, the user may download and utilize a profile, which is available in other countries, in the eUICC for the purpose of avoiding the burden of charging for a roaming service. However, if a profile, which is available in other countries, is enabled, while the user utilizes a service from the MNO of the other countries, the user may not receive a communication service such as a short message service (SMS) with the number used in the country where the user resides, according to the communication protocol defined in the standard document.

Aspects of the present disclosure are to address at least the above-mentioned problems and/or disadvantages and to provide at least the advantages described below. Accordingly, an aspect of the present disclosure is to provide a method in which an electronic device supports communication using a plurality of profiles, by using one secure element.

In accordance with an aspect of the present disclosure, an electronic device includes a housing, a display including a touch screen exposed through a part of the housing, a communication circuit supporting cellular communication, a secure element storing a plurality of profiles including a first profile associated with a first cellular network and a second profile associated with a second cellular network, a processor electrically connected to the display, the communication circuit, and the secure element, and a memory placed inside the housing and electrically connected or coupled to the processor. The memory stores a first application program and a second application program. The memory stores instructions, when executed, causing the processor to configure the first application program uses the first profile, and the second application program uses the second profile based at least partly on a user input, default settings, and/or a state of the electronic device, enable the first profile while disabling the second profile, and to perform a first operation associated with the second application program in a state where the first profile is enabled and the second profile is disabled.

In accordance with another aspect of the present disclosure, an electronic device includes a housing, a communication circuit supporting cellular communication, a secure element storing a plurality of profiles including a first profile associated with a first cellular network and a second profile associated with a second cellular network, at least one processor electrically connected to the communication circuit and the secure element, and a memory placed inside the housing and electrically connected or coupled to the at least one processor. The memory stores instructions that, when executed, cause the at least one processor, while the secure element enables the first profile, disable the second profile, to generate a profile list at least indicating that each of the first profile and the second profile is in an enable state, and to communicate with the first cellular network and the second cellular network through the communication circuit depending on the profile list.

In accordance with another aspect of the present disclosure, a method performed by an electronic device includes enabling one profile of a plurality of profiles stored in a secure element of the electronic device, obtaining profile information indicating that the one profile is in an enable state and another profile is in a disable state, from the secure element, and generating a profile list at least indicating that the another profile is in enable state, based on the profile information.

According to an embodiment of the present disclosure, an electronic device may provide a service associated with a plurality of profiles, by using one secure element.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 illustrates a screen displayed in a display of an electronic device in response to a user input, according to an embodiment;

DETAILED DESCRIPTION

Figure 1:
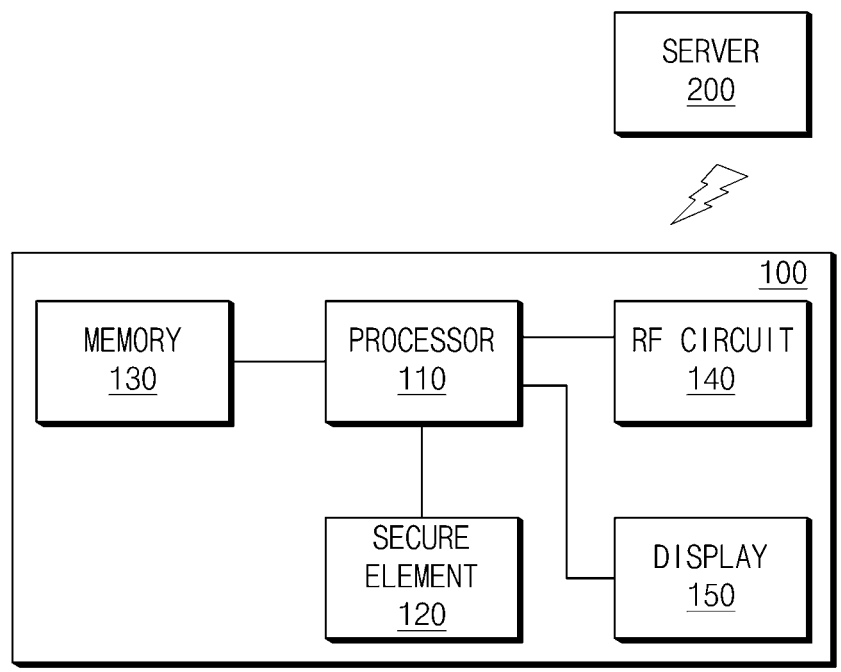
FIG. 1 illustrates an electronic device and a server providing the electronic device with a profile, according to an embodiment.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates an electronic device and a server providing the electronic device with a profile, according to an embodiment.

Referring to FIG. 1, an electronic device 100 may include a processor 110, a secure element 120, a memory 130, a radio frequency (RF) circuit 140, and a display 150. The configuration of the electronic device 100 illustrated in FIG. 1 is only an example and is variously changed to implement various embodiments disclosed in the present disclosure. For example, the electronic device 100 may include configurations the same as configurations of an electronic device 1201 of FIG. 12 or an electronic device 1301 of FIG. 13 or may be properly changed by using the configuration.

The processor 110 (e.g., a processor 1220 of FIG. 12) may perform an operation according to various embodiments of the present disclosure or may control other elements to perform the operation. For example, the processor 110 may transmit a command message or a request message to the secure element 120 and may receive a response message. The processor 110 may store information in the memory 130 for the purpose of managing a profile stored in the secure element 120 or may read the information stored in the memory 130. The processor 110 may communicate with an external device through the RF circuit 140. The processor 110 may support wired communication or wireless communication, which is associated with the profile stored in the secure element 120. The processor 110 may interact with a user through a display 150.

The secure element 120 (e.g., a secure module 1336 of FIG. 13) may store a plurality of profiles. The profile may be information that is provisioned as the secure element 120 or managed in the secure element 120. The secure element 120 may manage a profile depending on the command, command request, or request of the processor 110 and may transmit a response to the processor 110. Besides, the operation of the secure element 120 according to various embodiments of the present disclosure may refer to a GSMA-related standard document such as "SGP. 22-RSP spec version 2.0", "SGP. 21-RSP spec version 2.0", or the like.

The secure element 120 may be a software configuration or a hardware configuration. For example, the secure element 120 may be a configuration embedded in an electronic device for secure transaction and security maintenance. The secure element 120 may be, for example, an embedded SIM (eSIM) or an eUICC. The secure element 120 may be stored in the memory 130.

The memory 130 (e.g., a memory 1230 of FIG. 12) according to an embodiment may store information for supporting a service according to a plurality of profiles, at the same time. The memory 130 may store information generated by the processor 110. The memory 130 may store a protocol stack supporting a specific communication protocol. The memory 130 according to an embodiment may store instructions that cause the processor 110 to perform an operation according to an embodiment of the present disclosure. The memory 130 according to an embodiment may include the secure element 120 in a part of an area.

The RF circuit 140 (e.g., an RF module 1327 of FIG. 13) may communicate with an external device through a network. For example, the RF circuit 140 may communicate with a network by using wired communication or wireless communication associated with a specific profile. The wired communication or wireless communication service may be provided by an MNO. The wireless communication may follow a cellular communication protocol. The wireless communication may correspond to, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), or the like.

The display 150 may be used to interact with a user input. For example, the display 150 may display the profile management result of the secure element 120 or information generated by the processor 110 based on the profile management result. The display 150 may include a touch screen. For example, the display 150 may obtain the touch input of a user through the touch screen. The display 150 may transmit the touch input of the user to the processor 110.

A server 200 may transmit a profile to the electronic device 100. For example, the server 200 may be a subscriber management device such as subscription manager—data preparation (SM-DP).

Figure 2:
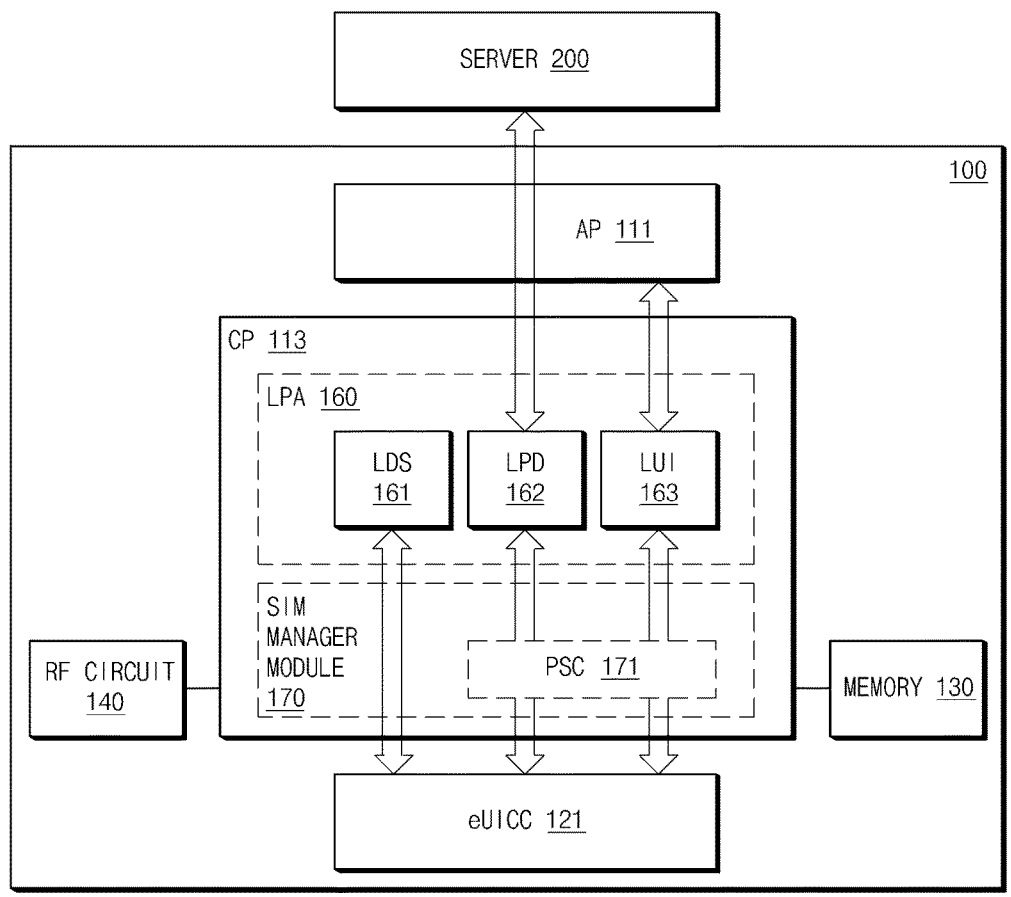
FIG. 2 illustrates the detailed configuration of an electronic device, according to an embodiment.

FIG. 2 illustrates the detailed configuration of an electronic device, according to an embodiment.

Referring to FIG. 2, the electronic device 100 may include an application processor (AP) 111, a communication processor (CP) 113, an eUICC 121, the memory 130, and the RF circuit 140.

The AP 111 and/or the CP 113 may correspond to the processor 110 of FIG. 1, and the eUICC 121 may correspond to the secure element 120 of FIG. 1. Hereinafter, for convenience of description, the description about a configuration, which is the same as that of FIG. 1, from among the configurations of FIG. 2 will be omitted.

The CP 113 may include a local profile assistant (LPA) module 160 and a SIM manager module 170. At least one of the LPA module 160 and the SIM manager module 170 may be a software configuration or a hardware configuration.

The LPA module 160 may support the profile management of the eUICC 121. The LPA module 160 may transmit a command or request for the profile management to the eUICC 121 and may process a response from the eUICC 121. The profile management operation may include, for example, profile download, profile installation, profile enable, profile disable, profile deletion, or a profile list. The LPA module 160 may include at least one of a local discovery service (LDS) module 161, a local profile download (LPD) module 162, or a local user interface (LUI) module 163.

The LDS module 161 may process an operation associated with subscription manager-discovery server (SM-DS). For example, the LDS module 161 may process a discovery request for the eUICC 121. The SM-DS may be a server storing an event record for the eUICC 121.

The LPD module 162 may support an operation associated with the profile download. The LPD module 162 may support secure transmission between the server 200 and the LPA module 160 for the purpose of delivering information associated with the profile download.

The LUI module 163 may support an operation associated with a user interface for the purpose of interacting with a user. The user may initiate a profile management operation through the LUI module 163. The LUI module 163 may obtain user intent associated with the profile management operation. The user intent may be, for example, profile enable, multi-profile enable, profile disable, profile deletion, or a profile list.

The SIM manager module 170 may directly communicate with the eUICC 121. For example, the SIM manager module 170 may transmit a command message to the eUICC 121 and may read elementary file (EF) information from the eUICC 121. If obtaining a command message associated with profile management from the LPA module 160, the SIM manager module 170 may transmit the obtained command message to the eUICC 121. The SIM manager module 170 may include a profile state controller (PSC) module 171. In the case where one module transmits the command message, which is obtained from an external module, to the eUICC 121, the corresponding message may be referred to as a "command request message".

The PSC module 171 may manage the eUICC 121 such that the electronic device 100 supports a multi-profile service. The PSC module 171 may store and manage channel information and session information of a client connected to a profile. For example, in the case where the PSC module 171 stores the session information for restoring the connection between a client and a profile and then the state of the profile is transitioned from a disable state to an enable state, the PSC module 171 may restore a connection state between a client and a profile, by using the stored information. The client and the profile may be connected to each other depending on the restoration operation of the PSC module 171 without an initialization operation.

An embodiment is exemplified in FIG. 2 as the PSC module 171 is included in the SIM manager module 170. However, the PSC module 171 may be implemented independently of the SIM manager module 170.

The eUICC 121 may store the profile and may perform an operation associated with the profile. For example, the eUICC 121 may receive the command message associated with the profile from the SIM manager module 170 and may transmit a response message as a response to the command message. For example, if enabling one profile, the eUICC 121 may implicitly disable the previously enabled profile.

The profile associated with a specific MNO may be stored in a secure domain of the eUICC 121. If the specific profile is enabled in the eUICC 121, the profile may be accessible to an application or data, which is associated with the specific profile. Other profiles may fail to access the application or the data, which is associated with the specific profile.

The file form stored in the eUICC 121 may be divided into a master file (MF), a dedicated file (DF), or an elementary file (EF). The MF may include an access condition and may selectively include DFs and EFs. The DF may be the parent file of the DFs and the EFs and may include file control information. The DF may be referred to a file identifier. The some identifiers of the DF may be reserved for a specific use. For example, the DF corresponding to file identifier '7F20' may be allocated for GSM. The EF may be a data unit or record that shares the same file identifier. The EF does not become the parent file of other files.

An embodiment is exemplified in FIG. 2 as the LPA module 160 is implemented by the CP 113. However, the LPA module 160 may be implemented by the AP 111 or may be implemented by the AP 111 and the CP 113. For example, the LPD module 162 may be implemented by the CP 113, and the LUI module 163 may be implemented by the AP 111. The LPA module 160 may be implemented by the eUICC 121. An embodiment is exemplified in FIG. 2 as the SIM manager module 170 is implemented independently of the LPA module 160. However, the SIM manager module 170 may be variously changed depending on embodiments disclosed in the present disclosure. For example, the SIM manager module 170 may include the LPA module 160. The SIM manager module 170 may be implemented by the eUICC 121.

Figure 3:
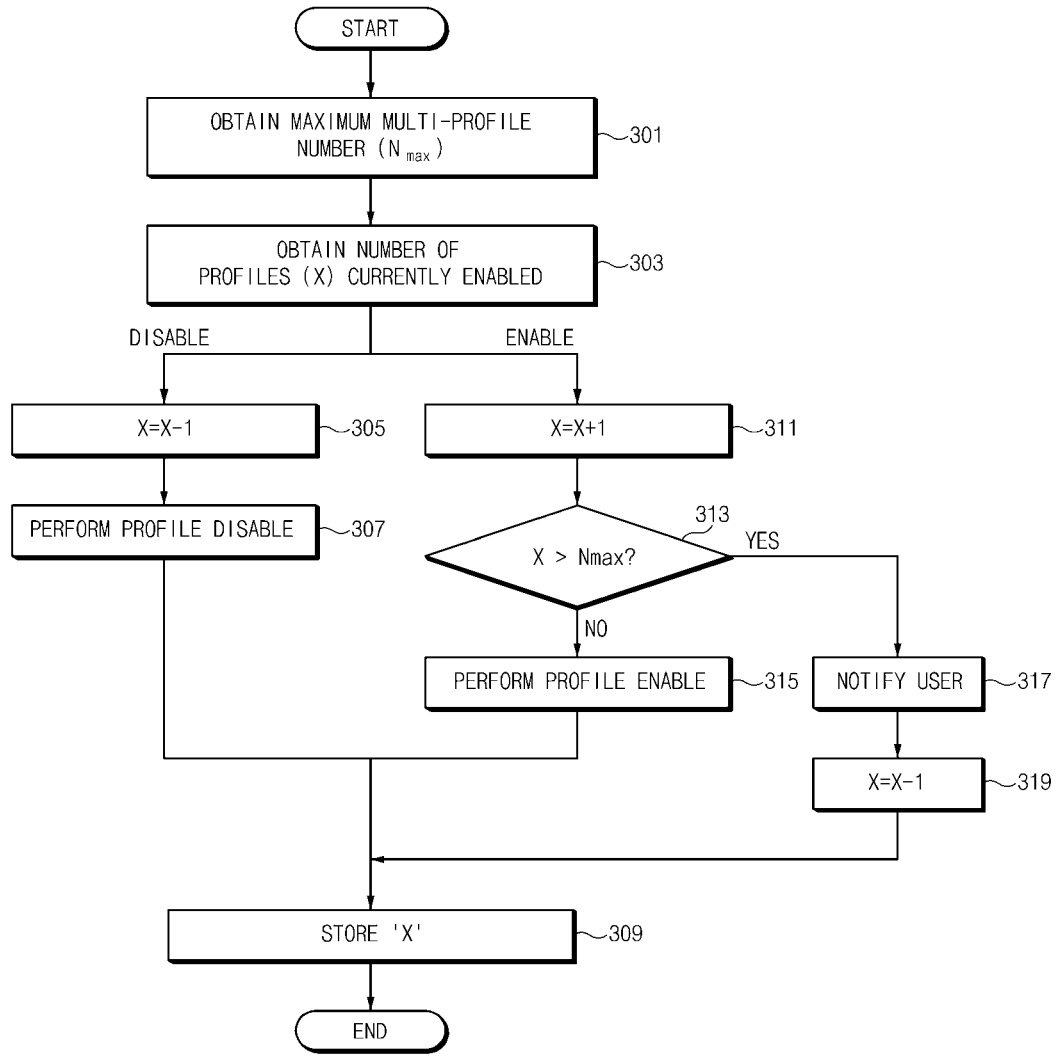
FIG. 3 illustrates a flowchart of a method in which an electronic device performs a multi-profile depending on the maximum supportable multi-profile number, according to an embodiment.

FIG. 3 illustrates a flowchart of a method in which an electronic device manages a profile depending on the maximum supportable multi-profile number, according to an embodiment.

According to an embodiment, in the case of the electronic device 100 supporting a service (hereinafter referred to as a "multi-profile" or "multi-profile service") that simultaneously enables a plurality of profiles by using the eUICC 121, the number of profiles capable of being simultaneously supported may be limited due to the limitation of the number of RF circuits and the number of protocol stacks, and the like. For example, the profile is capable of being installed in the eUICC 121 as many as the capacity of the memory 130.

However, the number of profiles capable of being simultaneously supported by an electronic device may be different from the number of profiles installed in the eUICC 121. In the case where the number of installed profiles is greater than the number of profiles capable of being simultaneously supported, there may be a limit to the number of profiles in each of which a multi-profile is possible. Since it is difficult for the LPA module 160 to recognize the number of profiles capable of being simultaneously supported by the electronic device 100 or the number of profiles installed in the eUICC, there is a need for a way to solve this problem.

Referring to FIG. 3, an electronic device (e.g., the electronic device 100), a processor (e.g., the processor 110), an LPA module (e.g., the LPA module 160), or a SIM manager module (e.g., the SIM manager module 170) may enable a multi-profile based on the maximum number of profiles (hereinafter refer to as the "maximum multi-profile number") in each of which a multi-profile is possible.

In operation 301, the electronic device may obtain the maximum multi-profile number or the number of maximum supportable profiles 'Nmax' and may store Nmax. In an embodiment, Nmax may be determined at a build or compile time due to the number of physical RF circuits (e.g., the RF circuit 140). Alternatively, Nmax in the electronic device may be determined by a PSC module (e.g., the PSC module 171). For example, the PSC module may determine Nmax based on the number of protocol stacks. The PSC module may transmit the determined Nmax to a LPA module, and the LPA module may notify a user of Nmax. For example, the LPA module may display Nmax through a display (e.g., the display 150).

In operation 303, the electronic device may store and verify the number of profiles 'X' currently enabled. The electronic device may perform the following operation depending on the obtained user intent.

In the case where the electronic device obtains user intent (or selection) corresponding to disable associated with the enabled profile, in operation 305, the electronic device may decrease 'X' by '1'. For example, the LPA module may decrease the number of profiles 'X' currently enabled, by '1'. In operation 307, the electronic device may disable the selected profile. For example, the LPA module may transmit, to the eUICC, a message for requesting the eUICC to disable the selected profile.

In operation 309, the electronic device may store a value of 'X' obtained in operation 305. For example, the LPA module may store the value of 'X' in a memory (e.g., the memory 130).

In the case where the electronic device obtains user intent corresponding to additional profile enable, the electronic device may perform an operation after operation 311. In operation 311, the electronic device may increase 'X' by '1'. For example, the LPA module may increase 'X' by '1'.

In operation 313, the electronic device may determine whether 'X' satisfies a specified condition. For example, the LPA module may determine whether 'X' exceeds Nmax. Herein, 'X' may be a value set depending on operation 311.

In the case where 'X' does not satisfy the specified condition, in operation 315, the electronic device may perform profile enable. For example, since additional multi-profile enable is possible, the LPA module may perform profile enable, and then may store 'X' in operation 309. 'X' may be a value set depending on operation 311.

In the case where 'X' satisfies the specified condition, in operation 317, the electronic device may notify a user that the number of profiles exceeds the maximum multi-profile number. For example, the LPA module may display a notice such as 'exceeding maximum supportable profile', in a display.

If 'X' exceeds Nmax, in operation 319, the electronic device may decrease 'X' by '1'. For example, the LPA module may decrease 'X' by '1' for the purpose of maintaining 'X' as Nmax, without performing additional multi-profile enable. In operation 309, the LPA module may store 'X'.

Figure 4:
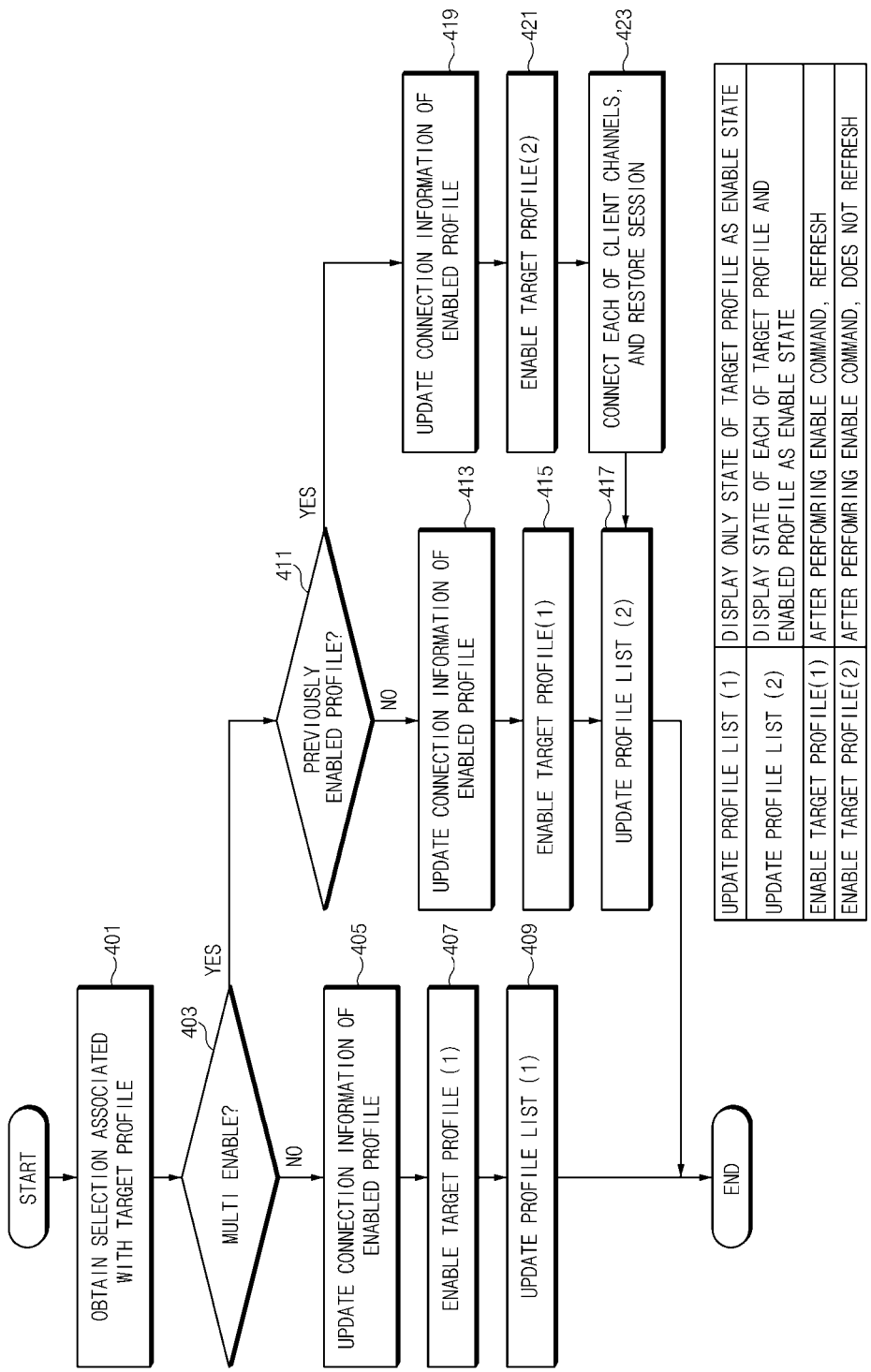
FIG. 4 illustrates a flowchart of a method in which an electronic device performs multi-profile, according to an embodiment.

FIG. 4 illustrates a flowchart of a method in which an electronic device performs multi-profile enable, according to an embodiment.

Referring to FIG. 4, a processor (e.g., the processor 110), an LPA module (e.g., the LPA module 160), or a SIM manager module (e.g., the SIM manager module 170) may perform profile enable or multi-profile enable depending on user selection. Hereinafter, in the description about FIG. 4, it is assumed that one profile is enabled in an eUICC (e.g., the eUICC 121). In the following description, at least one or more profiles enabled in the eUICC may be referred to "enabled profile", and a profile selected by a user for the purpose of enabling the profile may be referred to as "target profile".

In operation 401, an electronic device may obtain the selection associated with the target profile. The electronic device may obtain the user selection through a display (e.g., the display 150) including a touch screen. The LPA module may obtain information about the selected target profile through a LUI module (e.g., the LUI module 163).

In operation 403, the electronic device may determine whether user intent corresponds to multi-profile enable. The electronic device may obtain the selection of whether the user intent corresponds to multi-profile enable, for the purpose of grasping the user intent. For example, the LPA module may display a selection screen for grasping whether the user intent corresponds to multi-profile enable, in a display and may receive a user input to the selection screen.

In the case where the user intent that the electronic device receives is profile enable, in operation 405, the electronic device may update connection information of a profile. Since the connection information of the enabled profile is used to enable the corresponding profile later, a PSC module (e.g., the PSC module 171) may update the connection information of the enabled profile for the purpose of connection restoration with a client using the corresponding profile. Herein, the client may be a module requiring information about the state of the eUICC. The SIM manager module may notify the client whether a profile is changed. For example, the client may be an application program requiring profile information enabled in the eUICC.

If the state of the enabled profile is transitioned to a disable state in the eUICC, while information, which is connected to the profile, such as channel information, session information, personal identification number (PIN) authentication state information, or the like is reset, the connection between the profile and the client is disconnected. Accordingly, the PSC module may update connection information including at least one of client information, channel information, PIN authentication state information, or recently selected DF information. The connection information may be stored in the table form. Table 1 exemplifies a table in which the connection information is stored.

TABLE 1

| Profile ID | client | channel | Pin verified | Last selected DF |
|---|---|---|---|---|
| ICCID 1 | USIM | 1 | O | 7F00 |
| ICCID 1 | ISIM | 2 | O | 7F01 |
| ICCID 1 | PKCS | 1 | X | 7F02 |
| ICCID 1 | NFC | 2 | O | 7F04 |
| ICCID 2 | USIM | 1 | O | 7F05 |
| ICCID 2 | ISIM | 1 | O | 7F06 |
| ICCID 2 | CSIM | 3 | X | 7F07 |

Referring to Table 1, the electronic device may store the connection information in a connection information table for each profile identifier (ID) and for each client. For example, the profile ID may be an integrated circuit card identifier (ICCID). For example, the connection information table may be stored in a nonvolatile memory.

In operation 407, the electronic device may enable the target profile. The electronic device may transmit an enable request message to the eUICC. Since one profile is in an enabled state in the eUICC included in the electronic device at the same time, the eUICC may disable the enabled profile and may enable the target profile.

In the case where the electronic device transmits the enable request message to the eUICC, the electronic device may transmit a refresh command together. For example, the electronic device may transmit a refresh flag indicating whether to trigger a refresh after enable profile in the eUICC, together with the enable request message. The refresh after enable profile may be performed to notify each of clients connected to the profile that the profile has been changed. The refresh flag may be set to a value indicating that the eUICC is to perform the refresh for the purpose of notifying the client that the profile is changed. For example, the refresh flag may be set to 'true'. The eUICC in operation 407 may be in a reset mode.

The LPA module may perform the refresh to notify the client of the change. The internal profile state of the eUICC may be changed at a point in time when the refresh is used. In the case where the LPA module transmits the refresh flag and obtains a refresh command from the eUICC and the electronic device executes the refresh command and considers newly triggered profile, the electronic device may apply the change. In the case where the eUICC obtains the refresh flag, the eUICC may perform the refresh command. The operation of the eUICC associated with the refresh flag may be a refresh command transfer of a profile state change mode or a reset mode. In the reset mode, the electronic device may perform a session termination procedure on an application that has been activated.

In operation 409, the electronic device may update a profile list. The electronic device may make a request for profile information to the eUICC, for the purpose of updating the profile list. The electronic device may obtain the profile information from the eUICC and may update the profile list. The profile list may be information displayed in a display (e.g., 150) such that the user verifies the profile list.

Operation 409 may be performed by the LPA module or the PSC module. To notify user of the changed profile list after the enable occurs, for example, the LPA module may transmit a profile information request message to the eUICC. The eUICC may transmit profile information to the LPA module, as a response to the profile information request message. The profile information may include at least one of the states of profiles or the metadata of a profile. The LPA module may update the profile list based on profile information received from the eUICC and may display the profile list in the display. In this case, the target profile in the profile list and the profile information may be displayed as being in the enabled state.

In the case where the user intent that the electronic device receives is multi-profile enable, in operation 411, the electronic device may determine whether the target profile is the previously enabled profile. For example, the LPA module may determine whether the target profile is the previously enabled profile.

In the case where the target profile is not the previously enabled profile, in operation 413, the electronic device may update the connection information of the enabled profile or may update the connection information table. The PSC module may store the enable state of the enabled profile, channel information or session information of the client connected to the corresponding profile, or the like.

In operation 415, the electronic device may enable the target profile. The LPA module may transmit an enable request message to the eUICC. The eUICC may disable the enabled profile and may enable the target profile.

According to an embodiment, in the case where the LPA module transmits the enable request message to the eUICC, the LPA module may transmit a refresh flag together. For example, in the case where the target profile is not the previously enabled profile, the refresh flag may be set to 'true'.

In operation 417, the electronic device may update a profile list. The LPA module may transmit a profile information request message to the eUICC and may obtain profile information from the eUICC.

The LPA module may update the profile list based on the obtained profile information. Since the profile information indicates the profile state of the eUICC, the state of the target profile may be displayed as an enabled state. The LPA module may update the profile list for the purpose of indicating that a plurality of profiles are in the enabled state, depending on the user intent. According to an embodiment, the LPA module may change the profile state of the enabled profile to the enable state, based on the profile information from the eUICC. As displayed in the profile information, the LPA module may display the state of the target profile as an enable state. For example, the LPA module may display the profile list in a display.

In the case where the target profile is the previously enabled profile, in operation 419, the electronic device may update the connection information of the enabled profile. For example, the PSC module may store the enable state of the enabled profile, channel information or session information of the client connected to the corresponding profile, or the like.

In operation 421, the electronic device may enable the target profile. The LPA module may transmit an enable request message to the eUICC. Depending on the enable request message, the eUICC may disable the enabled profile and may enable the target profile. The electronic device may transmit a refresh flag together with the enable request message. The refresh flag may be set to 'false'.

In operation 423, the electronic device may restore the connection of the target profile. The PSC module may connect the target profile to each of client channels, by using the connection information of the target profile and may perform session restoration.

After the session restoration, the electronic device may perform operation 417. The LPA module may transmit a profile information request message to the eUICC and may obtain profile information from the eUICC. The profile information received from the eUICC may indicate that the enabled profile is in a disable state and the target profile is in an enable state. After changing the profile state of the enabled profile to an enable state in the profile information, the LPA module may display the profile list through the display.

The subject of each of operations of the electronic device in FIG. 4 may be illustrative and may be changed according to various embodiments. For example, the partial operation of the LPA module may be performed by the PSC module, and the partial operation of the PSC module may be performed by the LPA module.

Figure 5:
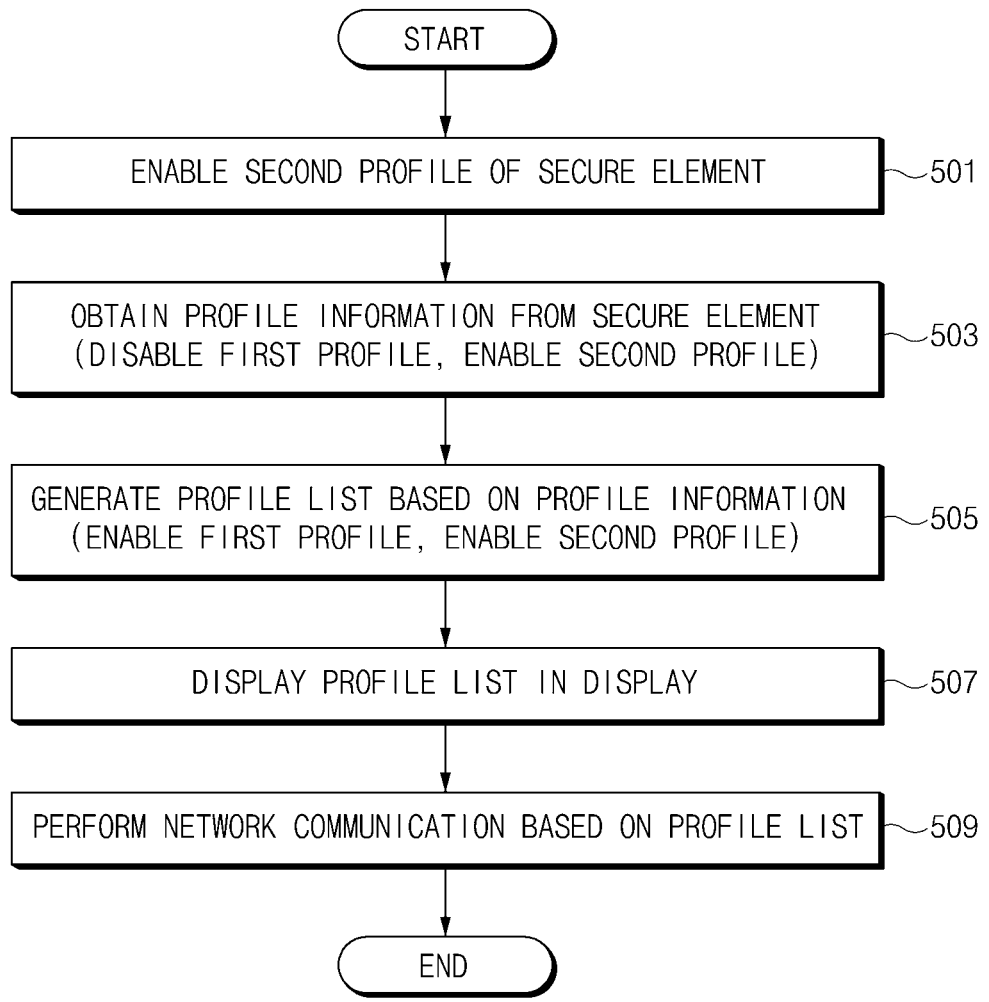
FIG. 5 illustrates a flowchart of an operation in which an electronic device updates a profile list, according to an embodiment.

FIG. 5 illustrates a flowchart of an operation in which an electronic device updates a profile list, according to an embodiment.

Referring to FIG. 5, a processor (e.g., the processor 110), an LPA module (e.g., the LPA module 160), or a SIM manager module (e.g., the SIM manager module 170) may update the profile list based on profile information for the purpose of supporting a multi-profile service depending on user selection. Hereinafter, in the description about FIG. 5, it is assumed that one profile is enabled in an eUICC (e.g., the eUICC 121). Hereinafter, in an initial stage, the profile enabled in the eUICC may be referred to as a "first profile", and the profile disabled in the eUICC may be referred to as a "second profile". In the following description, it is assumed that the electronic device obtains a multi-profile as user intent from a user.

In operation 501, the electronic device may enable the second profile. The LPA module may transmit an enable request message to the eUICC such that the eUICC enables the second profile. Depending on the enable request message, the eUICC may disable the first profile and may enable the second profile.

In operation 503, the electronic device may obtain profile information from a secure element. For example, the LPA module may make a request for the profile information to the secure element and may obtain the profile information from the secure element. The profile information obtained from the secure element may indicate the current profile state of the eUICC. Since the eUICC implicitly disables the first profile, the state of the first profile, which is indicated by the profile information, may be a disable state, and the state of the second profile may be an enable state.

In operation 505, the electronic device may generate a profile list based on the profile information. The LPA module may update the profile list based on the profile information. Even though the profile information indicates that the state of the first profile is the disable state, if the user intent is multi enable, the LPA module may generate the profile list such that the state of the first profile is displayed as the enable state.

In operation 507, the electronic device may display the profile list in a display. The LPA module may display the state of each of the first profile and the second profile as the enable state in the display.

In operation 509, the electronic device may perform network communication based on the profile list. The electronic device may perform the network communication associated with the profile of the enable state, depending on the profile list. Even though the first profile is in the disable state in the eUICC, the electronic device may perform an operation of each of both the first application associated with the first profile and the second application associated with the second profile, depending on the profile list generated by the LPA module.

An embodiment is exemplified in FIG. 5 as each of operations is performed by the LPA module. However, a part of the operations may be performed by the SIM manager module. For example, the SIM manager module may perform an operation of generating a profile list based on the profile information obtained from the eUICC and may transmit the generated list to the LPA module.

Figure 6:
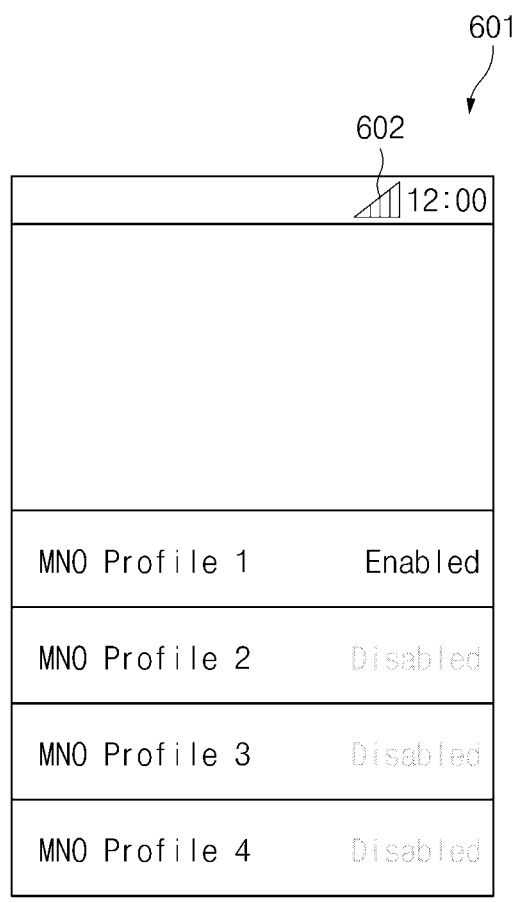
FIG. 6 illustrates a screen displayed in a display of an electronic device, according to an embodiment.
Figure 7:
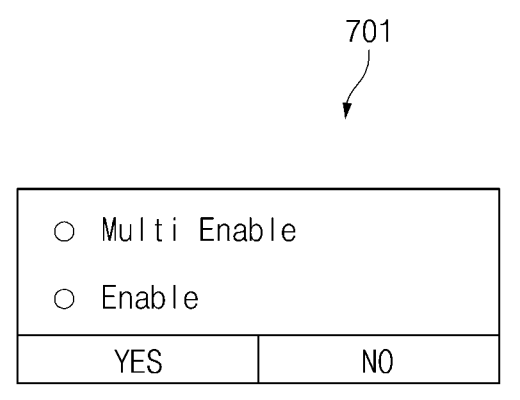
Figure 8:
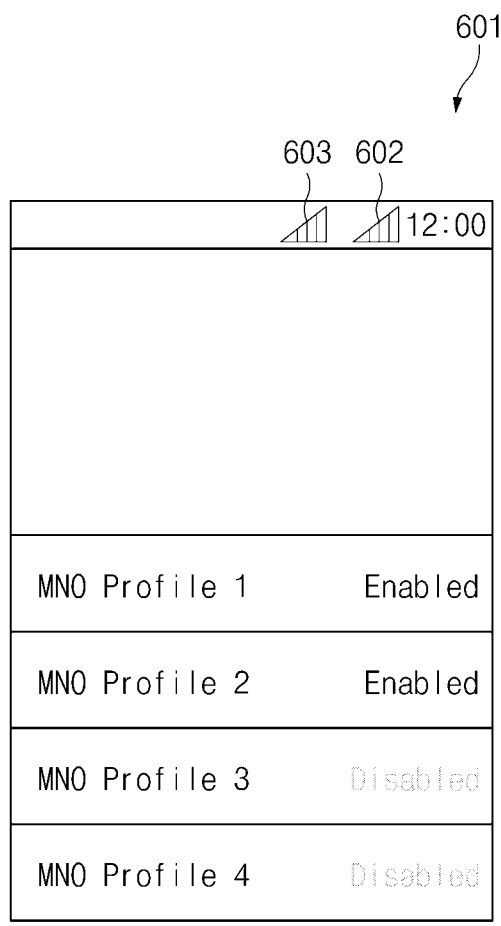
FIG. 8 illustrates a screen displayed in a display in a multi-profile enable state of an electronic device, according to an embodiment.

FIGS. 6 to 8 illustrate user interfaces of an electronic device.

FIG. 6 illustrates a first screen 601 in a state where a first profile (MNO profile 1) among profiles installed in an eUICC is enabled in an electronic device depending on user intent, according to an embodiment. A list indicating the states of profiles displayed in the first screen 601 may correspond to the profile list of an LPA module (e.g., the LPA module 160) or a PSC module (e.g., the PSC module 171).

From the user's perspective, since one profile is enabled, MNO-related information 602 associated with the first profile may be displayed in the first screen 601.

FIG. 7 illustrates a user interface for grasping user intent in an electronic device, according to an embodiment.

As illustrated in FIG. 6, in a state where a first screen (e.g., the first screen 601) is displayed in a display (e.g., the display 150), the user may select a profile through an input device such as a touch screen. Herein, it is assumed that the first profile is in an enable state.

Referring to FIG. 7, according to an embodiment, an electronic device (e.g., the electronic device 100) may display a second screen 701 for grasping user intent in response to the profile selected by a user, in at least part of the display. For example, the electronic device may display the second screen 701 in the form of a pop-up box associated with the first screen. In a state where the first profile is enabled, the second screen 701 may display an item for grasping whether the user intent is multi enable or enable. The electronic device may receive information about the fact that the user selects multi enable or enable.

FIG. 8 illustrates a user interface indicating an operation result of an electronic device according to user intent, according to an embodiment. In the case where the intent of a user corresponds to a multi-profile, FIG. 8 illustrates an operation result of an electronic device associated with the second profile (MNO profile 2) being a target profile.

When the second profile is enabled, the first profile is in a disable state in the eUICC, and the second profile is in an enable state in the eUICC. However, depending on the operation of the LPA module (e.g., the LPA module 160) or the PSC module (e.g., the PSC module 171), the state of each of the first profile and the second profile may be displayed as the enable state in the first screen 601.

The electronic device according to an embodiment may display both the MNO information 602 associated with the first profile and MNO information 603 associated with the second profile, in the first screen 601 depending on user intent.

Figure 9:
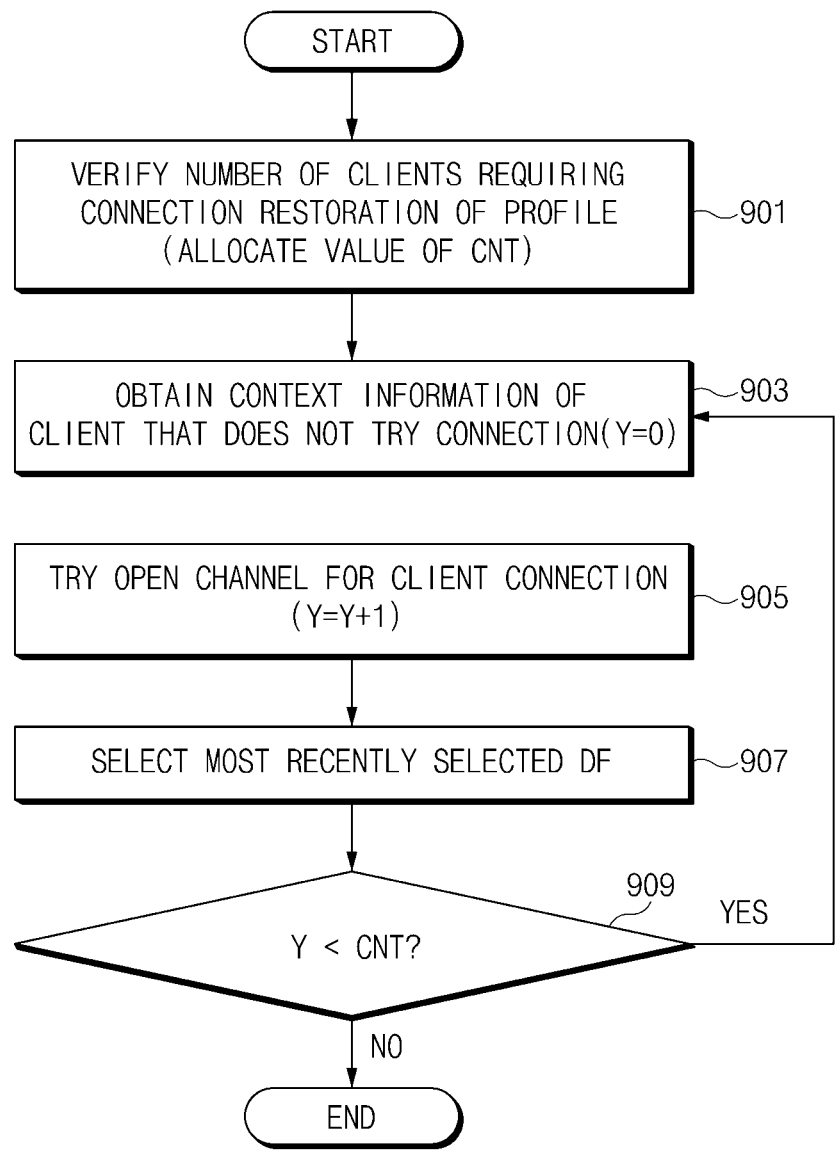
FIG. 9 illustrates a flowchart of a session restoration operation of an electronic device, according to an embodiment.

FIG. 9 illustrates a flowchart of a session restoration operation of an electronic device, according to an embodiment.

In the case of the previously enabled profile, an electronic device (e.g., the electronic device 100), a processor (e.g., the processor 110) or a PSC module (e.g., the PSC module 171) may perform session restoration by using context information (e.g., session information) stored depending on operation 423 of FIG. 4.

In operation 901, the electronic device may verify the number of clients requiring connection restoration of a profile. The PSC module may allocate the number of clients, that is, the value of CNT, requiring connection restoration.

As illustrated in Table 1, for example, the PSC module may determine the number of clients requiring session restoration, by using connection information stored in the table form.

In operation 903, operation 905, and operation 907, the electronic device may try to connect to a client that is not restored.

In operation 903, the electronic device may obtain the context information of a client that does not try the connection. For example, the PSC module may read the session information stored in a memory (e.g., the memory 130). In this case, the PSC module may set the number of clients 'Y', which try the connection, to '0'.

In operation 905, the electronic device may try open channel for connection to the client. For example, the PSC module may try the open channel and may increase 'Y' by 1.

In operation 907, the electronic device may select DF. For example, PSC module may select the most recently selected DF.

In operation 909, the electronic device may determine whether 'Y' satisfies a specified condition. For example, the electronic device may determine whether 'Y' is less than the number of clients 'CNT', which are connected to a profile.

If 'Y' satisfies the specified condition, the electronic device may perform operation 903 again. The electronic device may read context information of a client that does not try the connection.

If 'Y' does not satisfies a specified condition, the electronic device may terminate session restoration.

Figure 10:
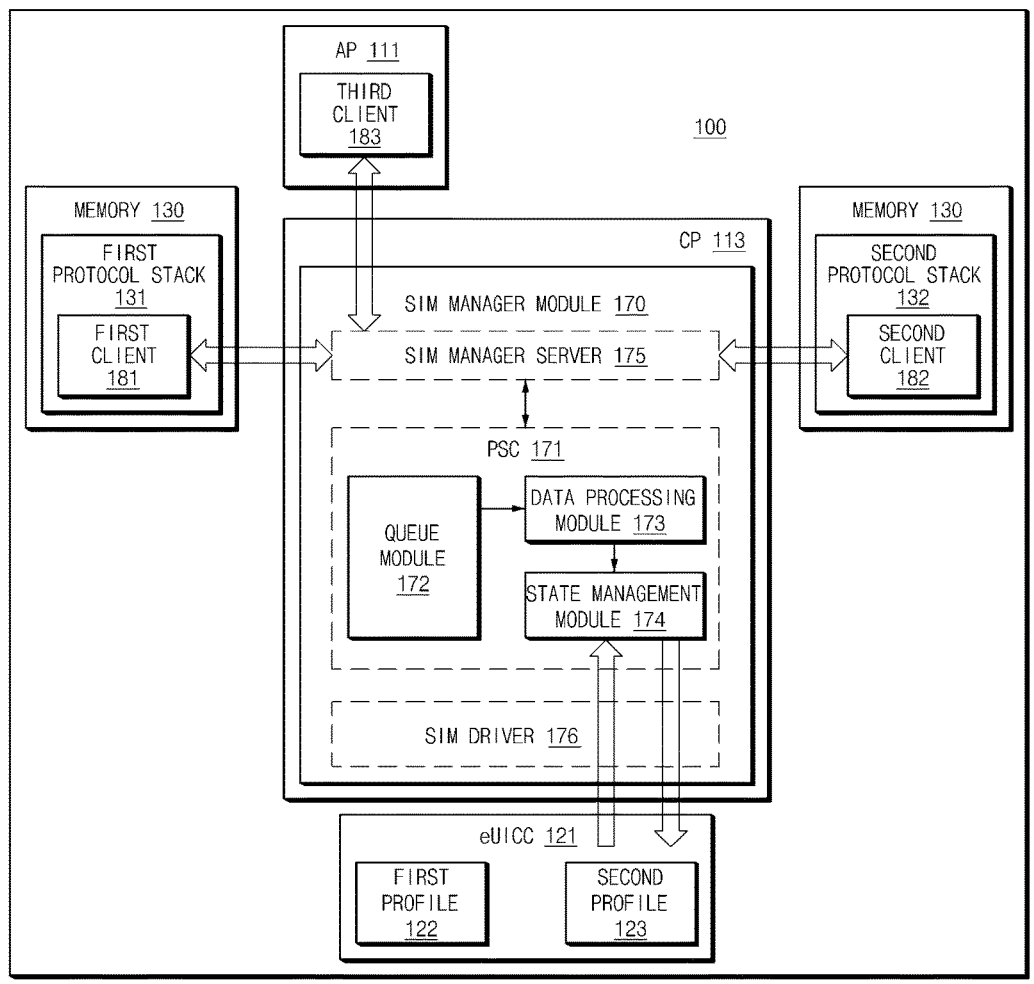
FIG. 10 illustrates a block diagram of an electronic device for describing an operation that an electronic device performs in a multi-profile enable state, according to an embodiment.

FIG. 10 illustrates a block diagram of an electronic device for describing an operation that an electronic device performs in a multi-profile enable state, according to an embodiment.

For convenience of description, in FIG. 10, the details about the configuration the same as the configuration of the electronic device 100 of FIG. 1 will not be repeated here. Referring to FIG. 10, the CP 113 may include the SIM manager module 170. The SIM manager module 170 may include the PSC module 171, a SIM manager server 175, and a SIM driver 176.

The PSC module 171 may include a queue module 172, a data processing module 173, and a state management module 174. According to an embodiment, at least one of the queue module 172, the data processing module 173, and the state management module 174 may be a software configuration or a hardware configuration.

The queue module 172 may queue data obtained from a client, or the like. The queue module 172 may forward the queued data to the data processing module 173. The queue module 172 may sequentially transmit data to the data processing module 173 depending on the data input order.

The data processing module 173 may verify the state of the eUICC 121 through the state management module 174. The data processing module 173 may process the queued data in the queue module 172, based on the state of the eUICC 121. The queued data in the queue module 172 may be a message obtained from the LPA module (e.g., the LPA module 160 of FIG. 1) or a message obtained from each client.

According to an embodiment, the data processing module 173 may determine whether the change in the state of a profile is used, for the purpose of processing the queued data in the queue module 172. For example, the data processing module 173 may determine that the change in the state of a profile is not used, if the profile that the profile ID obtained from the client indicates is currently in the enable state, or may determine that the change in the state of a profile is used, if the profile that the profile ID obtained from the client indicates is currently in a disable state.

The data processing module 173 may transmit data, which is received from the client, to the eUICC 121. If the eUICC 121 is in a state where command processing is possible and it is determined that the change in the state of a profile is used, the data processing module 173 may automatically enable the related target profile. For example, in the case where the operation of the enabled profile is terminated in the eUICC and the queued data is related to the target profile, the data processing module 173 may automatically enable the target profile. In this case, the enabled profile may be disabled depending on an operation conforming to the GSMA standard in the eUICC.

The state management module 174 may set an operating state depending on whether the state of the eUICC 121 is a state where command processing is possible. If the eUICC 121 is in a state where command processing is possible, the state management module 174 may set the operating state to an idle state, or if the eUICC 121 is in a state where command processing is impractical, the state management module 174 may set the operating state to a busy state.

The SIM manager server 175 may operate as a server in relation to the client. The SIM manager server 175 may transmit the data obtained from the client, to the PSC module 171 and may transmit the information obtained from the PSC module 171, to each client.

The SIM driver 176 may control the input/output of the SIM manager module 170. The SIM driver 176 may transmit the data or message generated by the SIM manager module 170, to the eUICC 121 and may transmit the data or message generated by the eUICC 121, to the PSC module 171 included in the SIM manager module 170.

The eUICC 121 included in an electronic device may store a plurality of profiles. For example, the eUICC 121 may store a first profile 122 and a second profile 123. In FIG. 10, it is assumed that the electronic device supports a multi-profile. For example, the electronic device may allow a user to recognize that both the first profile 122 and the second profile 123 are enabled.

According to an embodiment, the eUICC 121 may be connected to a plurality of clients. For example, the plurality of clients may include a first client 181 controlled by the CP 113, a second client 182 controlled by the CP 113, and/or a third client 183 controlled by the AP 111.

In FIG. 10, it is assumed that the profile stored in the eUICC 121 is associated with the first client 181 and the second client 182. The client may be an application, a service provider, or a program, which provides a service to the electronic device or the user. For example, the client may be an application program requiring profile information enabled in the eUICC 121. An application program may be stored in the memory 130.

The memory 130 may store a plurality of protocol stacks. A plurality of protocol stacks may include a first protocol stack 131 and a second protocol stack 132, which support a communication service conforming to different protocols. The protocol stacks may be associated with different profiles, respectively. For example, the first profile 122 may be associated with the first protocol stack 131, and the second profile 123 may be associated with the second protocol stack 132.

Each of a plurality of clients may be associated with at least one protocol stack. Alternatively, each of the plurality of protocol stacks may be associated with at least one client. For example, the first client 181 may provide the user with a service by using wireless communication supported by the first protocol stack 131, and the second client 182 may provide the user with a service by using wireless communication supported by the second protocol stack 132.

The relation between the client and the profile may be determined based at least partly on a user input, default settings, and/or the state of the electronic device. For example, in the case where the user has gone on a business trip abroad, the user may set the profile of a phone application to a first profile for the purpose of receiving a communication service provided by an MNO in the place where the user visits on business, and the user may set the profile of an SMS application to a second profile for the purpose of receiving a communication service provided by an MNO in the user's residence.

Hereinafter, FIG. 10 illustrates the operation in the multi-profile state of an electronic device, assuming that each of the first client 181 and the first protocol stack 131 is associated with the first profile and each of the second client 182 and the second protocol stack 132 is associated with the second profile.

As illustrated in FIG. 8, from the user's perspective, it is assumed in FIG. 10 that each of the first profile 122 and the second profile 123 is in an enable state. From the viewpoint of the eUICC 121, it is assumed that the first profile is in an enable state.

The PSC module 171 may obtain a profile ID and data from a client (e.g., 181). The profile ID may be a unique ID assigned to a client. The profile ID may be, for example, an ICCID.

The PSC module 171 may store the profile ID and the data that are obtained from the client. If the eUICC 121 is in an idle state, the PSC module 171 may verify the stored profile ID and the stored data. If the profile ID indicates the first profile 122, since the current first profile is in an enable state in the eUICC 121, the PSC module 171 may transmit the data to the eUICC 121.

If the profile ID indicates the second profile 123, since the current first profile is in an enable state in the eUICC 121, the PSC module 171 may transmit the data to the eUICC 121 after enabling the second profile 123. Herein, the first profile 122 of the eUICC 121 may be disabled implicitly.

According to an embodiment, in the case where the PSC module 171 enables the second profile 123, the PSC module 171 may perform a profile enable request without a refresh. For example, the PSC module 171 may set a refresh flag to 'false'. As illustrated in FIG. 10, the PSC module 171 may perform a session restoration procedure to rapidly restore the connection between the second profile 123 and the second client 182.

Even though the first profile 122 is disabled in the eUICC, the first client may still perform an operation associated with the first profile 122. Even though the first profile 122 is disabled, since there is no refresh of the eUICC, the first client may fail to grasp the change in the state of the eUICC. After the first client is connected to the first profile 122 when the first profile 122 is enabled, the first client may be regarded as being connected to the first profile 122, until grasping the change in the state of the first profile 122 based on the obtainment of information about a polling procedure or the change in a state, or the like. Accordingly, the first client may perform an operation associated with the first profile 122 even when the first profile 122 is disabled.

Since the second profile 123 is in an enable state, the second client may perform an operation associated with the second profile 123. In addition, as described in FIG. 10, in a multi-profile enable state, both the first client 181 and the second client 182 may perform operations associated with profiles depending on a data management operation of the PSC module 171, respectively.

Figure 11:
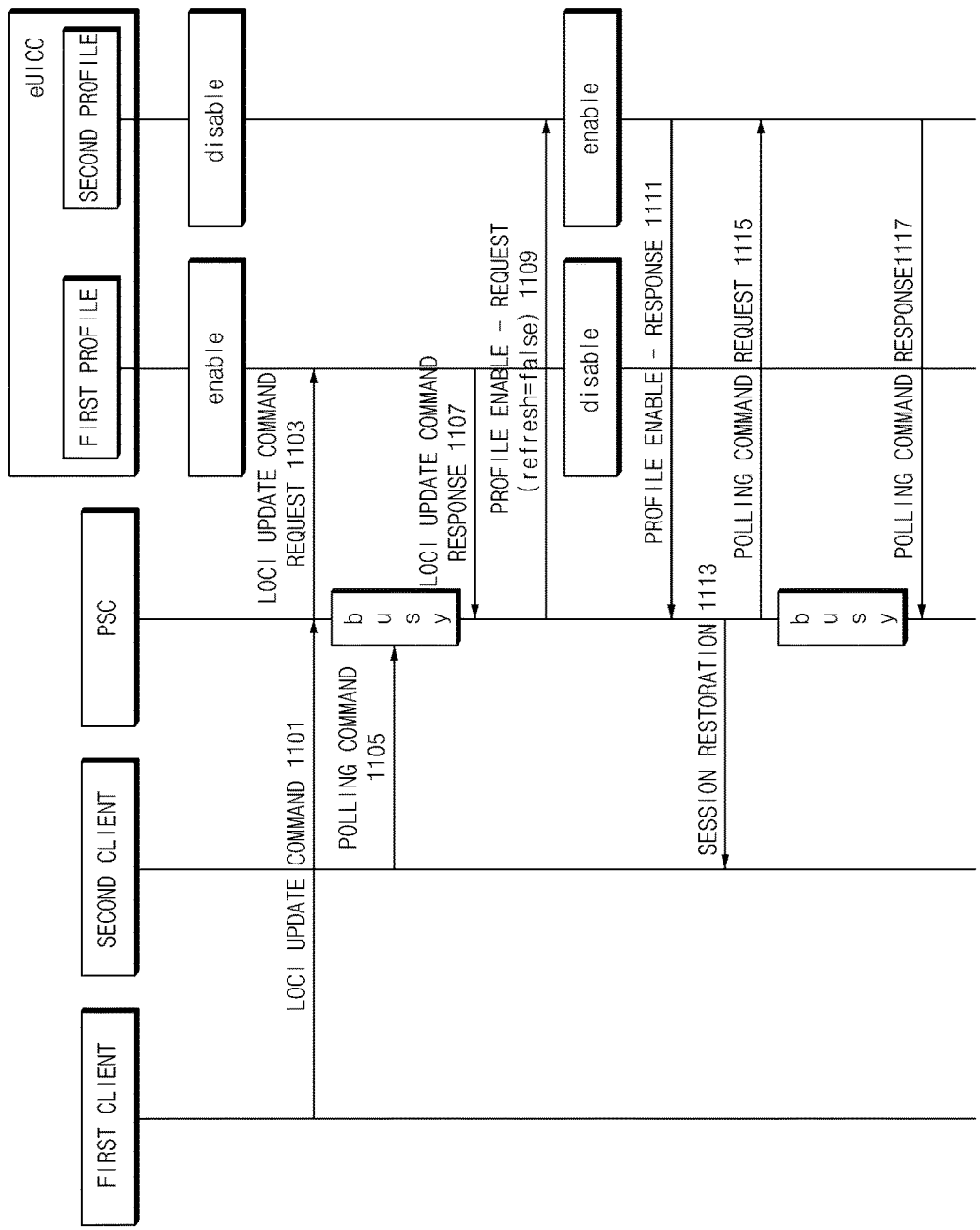
FIG. 11 illustrates a flowchart of an operation that an electronic device performs in a multi-profile enable state, according to an embodiment.

FIG. 11 illustrates a flowchart of an operation that an electronic device performs in a multi-profile enable state, according to an embodiment.

Hereinafter, in the case where a first client (e.g., the first client 181 of FIG. 10) and a second client (e.g., the second client 182 of FIG. 10) which are respectively associated with a first profile (e.g., the first profile 122 of FIG. 10) and a second profile (e.g., the second profile 123 of FIG. 10) respectively transmit a message associated with the first profile (e.g., the first profile 122 of FIG. 10) and a message associated with the second profile (e.g., the second profile 123 of FIG. 10), the operation of an electronic device will be described. To provide a user with a multi-profile service, the electronic device may manage the enable transition between profiles of the eUICC, by using a PSC module (e.g., the PSC module 171 of FIG. 10).

A message that the first client periodically or randomly transmits to the PSC module or the eUICC for the purpose of verifying the connection state, or the like may be refer to as a "first message", and a message that the second client transmits to the eUICC may be refer to as a "second message". In FIG. 11, for convenience of description, assuming that the first message is, for example, a location information (LOCI) update command message and the second message is a polling command message, the operation of an electronic device is described. However, the first message and the second message may be variously changed according to various embodiments.

In the following operation, in the eUICC, it is assumed that a first profile is enabled. From the user's perspective, it is assumed that both the first profile and the second profile are enabled.

In operation 1101, the first client may transmit the LOCI update command message to the PSC module. The LOCI update command message may be transmitted together with a profile ID indicating the first profile. For example, the LOCI update command message may be a message that instructs the eUICC to periodically or randomly update the location of the eUICC to the eUICC for the purpose of verifying the location of the electronic device. The LOCI of the electronic device may be information stored in the eUICC.

In operation 1103, the PSC module may transmit a LOCI update command request message to the eUICC and may set the state of the eUICC to a busy state.

In operation 1105, the PSC module may obtain a polling command message from the second client. The polling command message may be transmitted to the PSC module together with a profile ID indicating the second profile. For example, the polling command message may be a message used to periodically or randomly verify the connection state between a profile and a client. Since the PSC module sets the state of the eUICC to a busy state, the PSC module may queue a polling command. For example, the PSC module may queue the polling command message in a queue module (e.g., the queue module 172 of FIG. 10).

In operation 1107, the PSC module may obtain the LOCI update command response message from the eUICC. The PSC module 171 may determine that the operation of the eUICC is completed and may set the state of the eUICC to an idle state. After obtaining the LOCI update command response message from the eUICC, the PSC module may transmit a LOCI update response message to the first client.

In operation 1109, according to an embodiment, the PSC module may transmit the profile enable request message to the eUICC. For example, the PSC module may verify the queued polling command and profile ID; since the second profile is in the disable state in the eUICC, the PSC module may transmit a profile enable request message for the purpose of enabling the second profile. Since the second profile is a profile that has been previously enabled, the electronic device may set a refresh flag to 'false'. Depending on the enable request message associated with the second profile, the eUICC may disable the first profile and may enable the second profile.

In operation 1111, the eUICC may transmit a profile enable response message to the PSC module.

In operation 1113, the electronic device may restore the connection between the second client and the second profile. For example, the PSC module may perform session restoration between the second client and the second profile, by using the stored connection information.

In operation 1115, the electronic device may transmit the queued polling command request message to the eUICC. For example, after transmitting the polling command request message, the PSC module may convert the operating state to the busy state.

In operation 1117, the electronic device may obtain a polling command response message from the eUICC. The PSC module may obtain the polling command response message and may convert the operating state to the idle state. The PSC module may transmit the response of the eUICC associated with the polling command message of the first client. After obtaining the polling command response message from the eUICC, the PSC module may transmit a polling response message to the first client.

Figure 12:
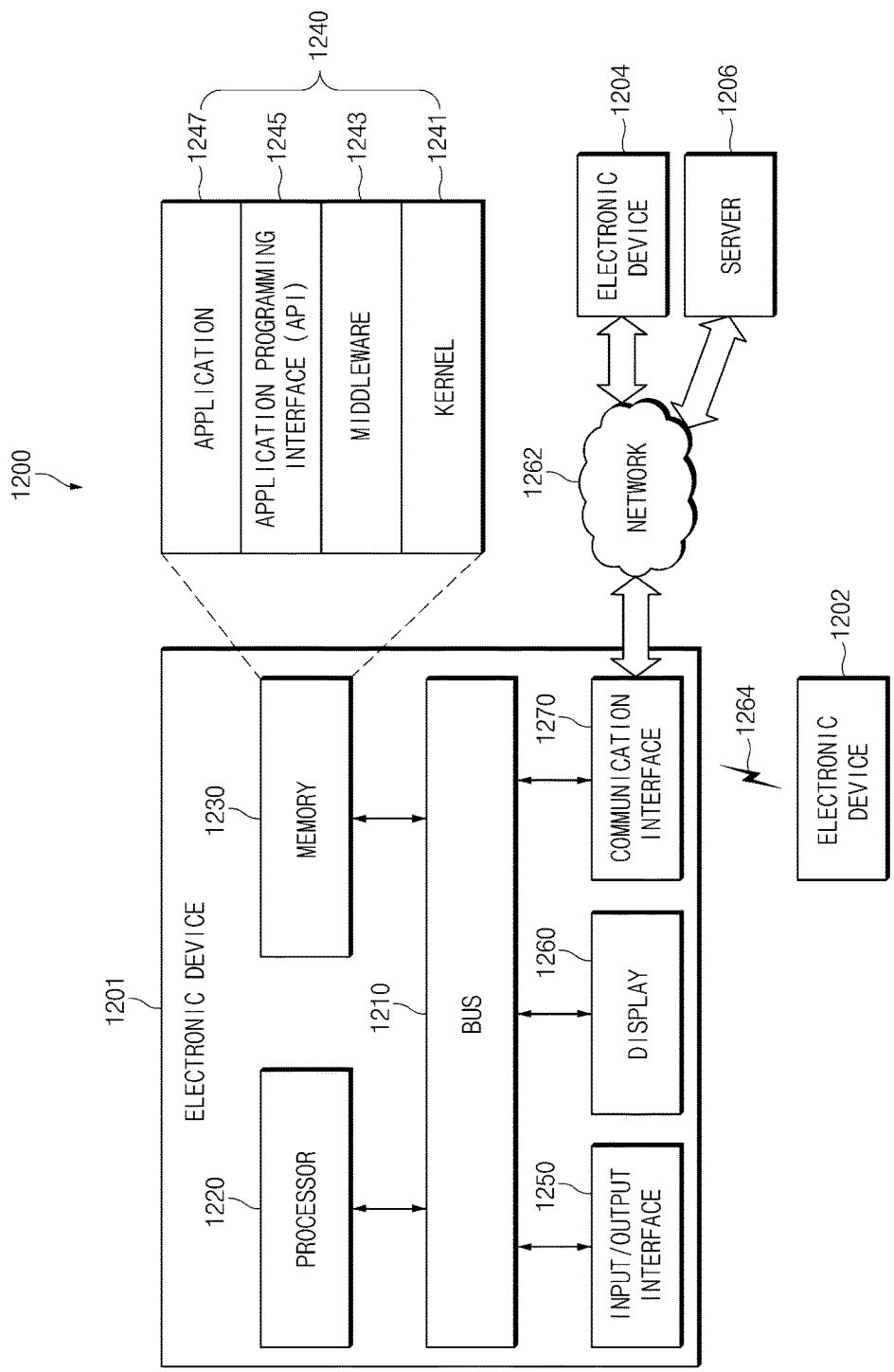
FIG. 12 illustrates the electronic device in a network environment according to various embodiments.

FIG. 12 illustrates an electronic device in a network environment system, according to an embodiment.

Referring to FIG. 12, according to various embodiments, an electronic device 1201, a first electronic device 1202, a second electronic device 1204, or a server 1206 may be connected each other over a network 1262 or a short range communication 1264. The electronic device 1201 may include a bus 1210, a processor 1220, a memory 1230, an input/output interface 1250, a display 1260, and a communication interface 1270. According to an embodiment, the electronic device 1201 may not include at least one of the above-described elements or may further include other element(s).

For example, the bus 1210 may interconnect the above-described elements 1220 to 1270 and may include a circuit for conveying communications (e.g., a control message and/or data) among the above-described elements.

The processor 1220 may include one or more of a central processing unit (CPU), an application processor (AP), or a communication processor (CP). For example, the processor 1220 may perform an arithmetic operation or data processing associated with control and/or communication of at least other elements of the electronic device 1201.

The memory 1230 may include a volatile and/or nonvolatile memory. For example, the memory 1230 may store instructions or data associated with at least one other element(s) of the electronic device 1201. According to an embodiment, the memory 1230 may store software and/or a program 1240. The program 1240 may include, for example, a kernel 1241, a middleware 1243, an application programming interface (API) 1245, and/or an application program (or "an application") 1247. At least a part of the kernel 1241, the middleware 1243, or the API 1245 may be referred to as an "operating system (OS)".

For example, the kernel 1241 may control or manage system resources (e.g., the bus 1210, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete elements of the electronic device 1201 so as to control or manage system resources.

The middleware 1243 may perform, for example, a mediation role such that the API 1245 or the application program 1247 communicates with the kernel 1241 to exchange data.

Furthermore, the middleware 1243 may process task requests received from the application program 1247 according to a priority. For example, the middleware 1243 may assign the priority, which makes it possible to use a system resource (e.g., the bus 1210, the processor 1220, the memory 1230, or the like) of the electronic device 1201, to at least one of the application program 1247. For example, the middleware 1243 may process the one or more task requests according to the priority assigned to the at least one, which makes it possible to perform scheduling or load balancing on the one or more task requests.

The API 1245 may be, for example, an interface through which the application program 1247 controls a function provided by the kernel 1241 or the middleware 1243, and may include, for example, at least one interface or function (e.g., an instruction) for a file control, a window control, image processing, a character control, or the like.

The input/output interface 1250 may play a role, for example, of an interface which transmits an instruction or data input from a user or another external device, to other element(s) of the electronic device 1201. Furthermore, the input/output interface 1250 may output an instruction or data, received from other element(s) of the electronic device 1201, to a user or another external device.

The display 1260 may include, for example, a liquid crystal display (LCD), a light-emitting diode (LED) display, an organic LED (OLED) display, a microelectromechanical systems (MEMS) display, or an electronic paper display. The display 1260 may display, for example, various contents (e.g., a text, an image, a video, an icon, a symbol, and the like) to a user. The display 1260 may include a touch screen and may receive, for example, a touch, gesture, proximity, or hovering input using an electronic pen or a part of a user's body.

For example, the communication interface 1270 may establish communication between the electronic device 1201 and an external device (e.g., the first electronic device 1202, the second electronic device 1204, or the server 1206). For example, the communication interface 1270 may be connected to the network 1262 over wireless communication or wired communication to communicate with the external device (e.g., the second electronic device 1204 or the server 1206).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1264. The short range communication 1264 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1201 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1262 may include at least one of telecommunications networks, for example, a computer network (e.g., LAN or WAN), an Internet, or a telephone network.

Each of the first and second electronic devices 1202 and 1204 may be a device of which the type is different from or the same as that of the electronic device 1201. According to an embodiment, the server 1206 may include a group of one or more servers. According to various embodiments, all or a portion of operations that the electronic device 1201 will perform may be executed by another or plural electronic devices (e.g., the first electronic device 1202, the second electronic device 1204 or the server 1206). According to an embodiment, in the case where the electronic device 1201 executes any function or service automatically or in response to a request, the electronic device 1201 may not perform the function or the service internally, but, alternatively additionally, the electronic device 1201 may request at least a portion of a function associated with the electronic device 1201 from another device (e.g., the electronic device 1202 or 1204 or the server 1206). The other electronic device may execute the requested function or additional function and may transmit the execution result to the electronic device 1201. The electronic device 1201 may provide the requested function or service using the received result or may additionally process the received result to provide the requested function or service. To this end, for example, cloud computing, distributed computing, or client-server computing may be used.

Figure 13:
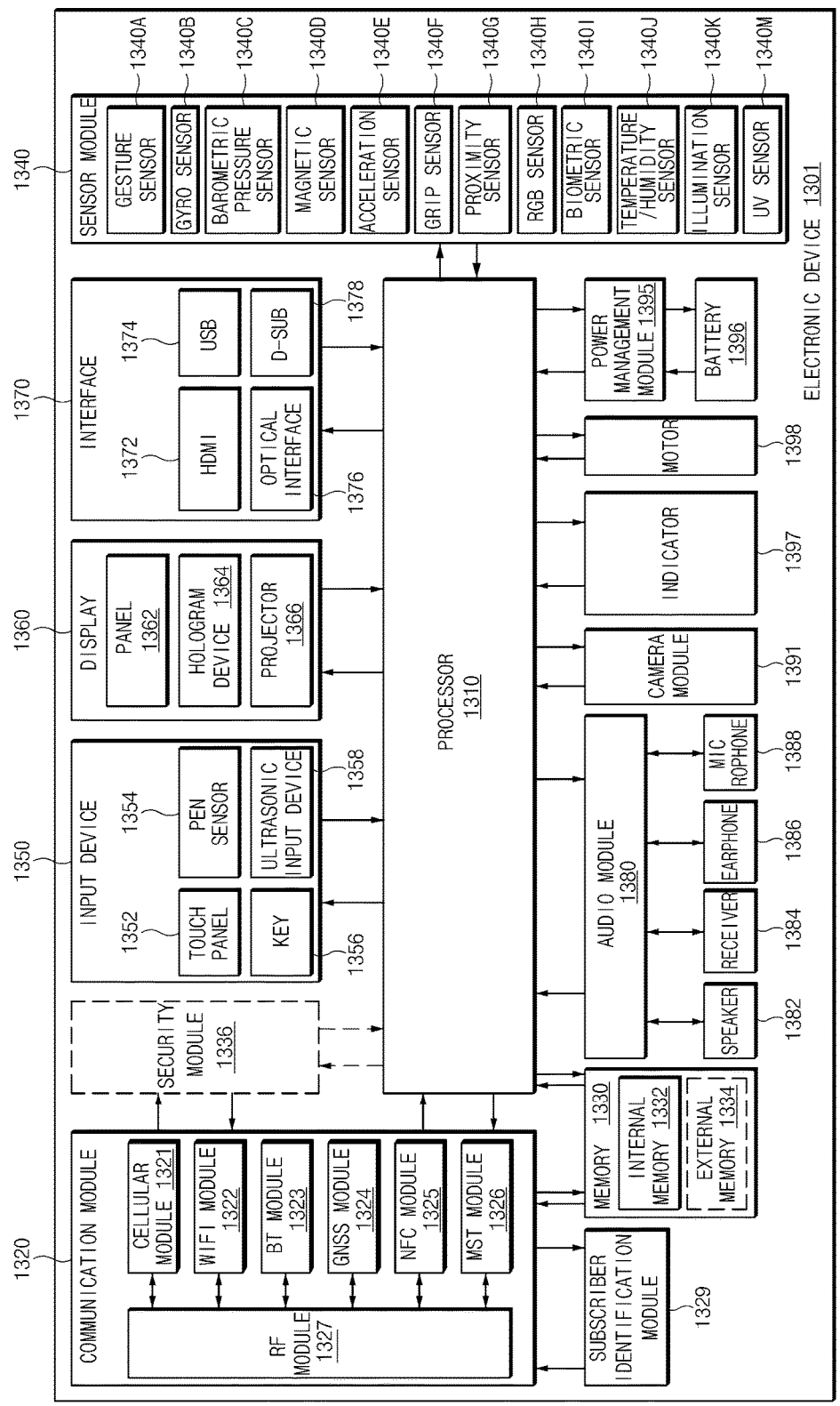
FIG. 13 illustrates a block diagram of the electronic device according to various embodiments.

FIG. 13 illustrates a block diagram of an electronic device, according to various embodiments.

Referring to FIG. 13, an electronic device 1301 may include, for example, all or a part of the electronic device 1201 illustrated in FIG. 12. The electronic device 1301 may include one or more processors (e.g., an application processor (AP)) 1310, a communication module 1320, a subscriber identification module 1329, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may drive, for example, an operating system (OS) or an application to control a plurality of hardware or software elements connected to the processor 1310 and may process and compute a variety of data. For example, the processor 1310 may be implemented with a System on Chip (SoC). According to an embodiment, the processor 1310 may further include a graphic processing unit (GPU) and/or an image signal processor. The processor 1310 may include at least a part (e.g., a cellular module 1321) of elements illustrated in FIG. 13. The processor 1310 may load a command or data, which is received from at least one of other elements (e.g., a nonvolatile memory), into a volatile memory and process the loaded command or data. The processor 1310 may store a variety of data in the nonvolatile memory.

The communication module 1320 may be configured the same as or similar to the communication interface 1270 of FIG. 12. The communication module 1320 may include the cellular module 1321, a Wi-Fi module 1322, a Bluetooth (BT) module 1323, a GNSS module 1324 (e.g., a GPS module, a Glonass module, a Beidou module, or a Galileo module), a near field communication (NFC) module 1325, a MST module 1326 and a radio frequency (RF) module 1327.

The cellular module 1321 may provide, for example, voice communication, video communication, a character service, an Internet service, or the like over a communication network. According to an embodiment, the cellular module 1321 may perform discrimination and authentication of the electronic device 1301 within a communication network by using the subscriber identification module (e.g., a SIM card) 1329. According to an embodiment, the cellular module 1321 may perform at least a portion of functions that the processor 1310 provides. According to an embodiment, the cellular module 1321 may include a communication processor (CP).

Each of the Wi-Fi module 1322, the BT module 1323, the GNSS module 1324, the NFC module 1325, or the MST module 1326 may include a processor for processing data exchanged through a corresponding module, for example. According to an embodiment, at least a part (e.g., two or more) of the cellular module 1321, the Wi-Fi module 1322, the BT module 1323, the GNSS module 1324, the NFC module 1325, or the MST module 1326 may be included within one Integrated Circuit (IC) or an IC package.

For example, the RF module 1327 may transmit and receive a communication signal (e.g., an RF signal). For example, the RF module 1327 may include a transceiver, a power amplifier module (PAM), a frequency filter, a low noise amplifier (LNA), an antenna, or the like. According to another embodiment, at least one of the cellular module 1321, the Wi-Fi module 1322, the BT module 1323, the GNSS module 1324, the NFC module 1325, or the MST module 1326 may transmit and receive an RF signal through a separate RF module.

The subscriber identification module 1329 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1330 (e.g., the memory 1230) may include an internal memory 1332 or an external memory 1334. For example, the internal memory 1332 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1334 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1334 may be operatively and/or physically connected to the electronic device 1301 through various interfaces.

A security module 1336 may be a module that includes a storage space of which a security level is higher than that of the memory 1330 and may be a circuit that guarantees safe data storage and a protected execution environment. The security module 1336 may be implemented with a separate circuit and may include a separate processor. For example, the security module 1336 may be in a smart chip or a secure digital (SD) card, which is removable, or may include an embedded secure element (eSE) embedded in a fixed chip of the electronic device 1301. Furthermore, the security module 1336 may operate based on an operating system (OS) that is different from the OS of the electronic device 1301. For example, the security module 1336 may operate based on java card open platform (JCOP) OS.

The sensor module 1340 may measure, for example, a physical quantity or may detect an operation state of the electronic device 1301. The sensor module 1340 may convert the measured or detected information to an electric signal. For example, the sensor module 1340 may include at least one of a gesture sensor 1340A, a gyro sensor 1340B, a barometric pressure sensor 1340C, a magnetic sensor 1340D, an acceleration sensor 1340E, a grip sensor 1340F, the proximity sensor 1340G, a color sensor 1340H (e.g., red, green, blue (RGB) sensor), a biometric sensor 1340I, a temperature/humidity sensor 1340J, an illuminance sensor 1340K, or an UV sensor 1340M. Although not illustrated, additionally or generally, the sensor module 1340 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling at least one or more sensors included therein. According to an embodiment, the electronic device 1301 may further include a processor that is a part of the processor 1310 or independent of the processor 1310 and is configured to control the sensor module 1340. The processor may control the sensor module 1340 while the processor 1310 remains at a sleep state.

The input device 1350 may include, for example, a touch panel 1352, a (digital) pen sensor 1354, a key 1356, or an ultrasonic input unit 1358. For example, the touch panel 1352 may use at least one of capacitive, resistive, infrared and ultrasonic detecting methods. Also, the touch panel 1352 may further include a control circuit. The touch panel 1352 may further include a tactile layer to provide a tactile reaction to a user.

The (digital) pen sensor 1354 may be, for example, a part of a touch panel or may include an additional sheet for recognition. The key 1356 may include, for example, a physical button, an optical key, a keypad, or the like. The ultrasonic input device 1358 may detect (or sense) an ultrasonic signal, which is generated from an input device, through a microphone (e.g., a microphone 1388) and may check data corresponding to the detected ultrasonic signal.

The display 1360 (e.g., the display 1260) may include a panel 1362, a hologram device 1364, or a projector 1366. The panel 1362 may be the same as or similar to the display 1260 illustrated in FIG. 12. The panel 1362 may be implemented, for example, to be flexible, transparent, or wearable. The panel 1362 and the touch panel 1352 may be integrated into a single module. The hologram device 1364 may display a stereoscopic image in a space using a light interference phenomenon. The projector 1366 may project light onto a screen so as to display an image. For example, the screen may be arranged in the inside or the outside of the electronic device 1301. According to an embodiment, the display 1360 may further include a control circuit for controlling the panel 1362, the hologram device 1364, or the projector 1366.

The interface 1370 may include, for example, a high-definition multimedia interface (HDMI) 1372, a universal serial bus (USB) 1374, an optical interface 1376, or a D-subminiature (D-sub) 1378. The interface 1370 may be included, for example, in the communication interface 1270 illustrated in FIG. 12. Additionally or generally, the interface 1370 may include, for example, a mobile high definition link (MHL) interface, a SD card/multimedia card (MMC) interface, or an infrared data association (IrDA) standard interface.

The audio module 1380 may convert a sound and an electric signal in dual directions. At least a part of the audio module 1380 may be included, for example, in the input/output interface 1250 illustrated in FIG. 12. The audio module 1380 may process, for example, sound information that is input or output through a speaker 1382, a receiver 1384, an earphone 1386, or the microphone 1388.

For example, the camera module 1391 may shoot a still image or a video. According to an embodiment, the camera module 1391 may include at least one or more image sensors (e.g., a front sensor or a rear sensor), a lens, an image signal processor (ISP), or a flash (e.g., an LED or a xenon lamp).

The power management module 1395 may manage, for example, power of the electronic device 1301. According to an embodiment, a power management integrated circuit (PMIC), a charger IC, or a battery or fuel gauge may be included in the power management module 1395. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, and the like. The motor 1398 may convert an electrical signal into a mechanical vibration and may generate the following effects: vibration, haptic, and the like. Although not illustrated, a processing device (e.g., a GPU) for supporting a mobile TV may be included in the electronic device 1301. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 110), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a housing;
   a display including a touch screen exposed through a part of the housing;
   a communication circuit configured to support cellular communication;
   a secure element configured to store a plurality of profiles including a first profile associated with a first cellular network and a second profile associated with a second cellular network;
   a processor electrically connected to the display, the communication circuit, and the secure element; and
   a memory placed inside the housing and electrically connected or coupled to the processor,
   wherein the memory stores a first application program and a second application program, and
   wherein the memory stores instructions, that when executed, cause the processor to:
      configure the first application program using the first profile and the second application program using the second profile based at least partly on a user input, default settings, and/or a state of the electronic device;
      enable the first profile while disabling the second profile; and
      perform a first operation associated with the second application program in a state where the first profile is enabled and the second profile is disabled,
   wherein the first operation comprises restoring a connection of a second profile using channel information and session information associated with the second profile.

2. The electronic device of claim 1, wherein the instructions further cause the processor to:
   determine whether to enable the second profile and disable the first profile, to perform a second operation associated with the second application program;
   enable the second profile and disable the first profile, depending on the determination; and
   perform the second operation by using the second profile.

3. The electronic device of claim 2, wherein the instructions further cause the processor to:
   after performing the second operation, enable the first profile and disable the second profile.

4. The electronic device of claim 1, wherein the secure element includes an embedded universal integrated circuit card (eUICC).

5. The electronic device of claim 1, wherein the instructions further cause the processor to:
   perform the first operation associated with the second application program so as to conform to a global system for mobile communication association (GSMA) standard.

6. The electronic device of claim 1, wherein the first application program includes a phone application, and
   wherein the second application program includes a short message service (SMS) application.

7. The electronic device of claim 1, wherein the first application program includes a phone application, and
   wherein the second application program includes a web browser application.

8. The electronic device of claim 1, wherein the instructions further cause the processor to:
   display each of the first profile and the second profile as an enabled state in the display.

9. The electronic device of claim 1, wherein the instructions further cause the processor to:
   obtain user selection through the display; and
   enable the first profile based on the user selection.

10. The electronic device of claim 1, wherein the memory stores connection information for restoring connection between the first profile and the first application program, and wherein the instructions further cause the processor to:
connect the first profile to the first application program by using the connection information.

11. The electronic device of claim 1, wherein the instructions further cause the processor to:
obtain a maximum multi-profile number in which a multi-profile is possible; and
determine whether a multi-profile of the first profile is possible, based on the maximum multi-profile number.

12. An electronic device comprising:
a housing;
a communication circuit configured to support cellular communication;
a secure element configured to store a plurality of profiles including a first profile associated with a first cellular network and a second profile associated with a second cellular network;
at least one processor electrically connected to the communication circuit and the secure element, and
a memory placed inside the housing and electrically connected or coupled to the at least one processor,
wherein the memory stores instructions that, when executed, cause the at least one processor to, while the secure element enables the first profile and disables the second profile,
generate a profile list indicating that each of the first profile and the second profile is in an enabled state;
communicate with the first cellular network using the first profile through the communication circuit; and
communicate with the second cellular network using the second profile through the communication circuit by restoring a connection to the second cellular network using channel information and session information associated with the second profile.

13. The electronic device of claim 12, wherein the instructions further cause the at least one processor to:
obtain profile information from the secure element; and
generate the profile list based on the profile information.

14. The electronic device of claim 13, wherein the profile information indicates that the first profile among the first profile and the second profile is in the enabled state.

15. The electronic device of claim 12, further comprising:
a display exposed through a part of the housing; and
wherein the instructions further cause the at least one processor to:
display the profile list in the display.

16. The electronic device of claim 15, wherein the instructions further cause the at least one processor to:
obtain a selection associated with the first profile through the display.

17. The electronic device of claim 16, wherein the instructions further cause the at least one processor to:
display a screen including an item for selecting a multi-profile of the first profile and second profile, in the display in response to the selection associated with the first profile.

18. The electronic device of claim 12, wherein the instructions further cause the at least one processor to:
set a refresh flag so as to indicate that a refresh is not performed; and
if enabling the first profile, transmit the refresh flag to the secure element.

19. The electronic device of claim 12, wherein the secure element is configured to manage the first profile and the second profile so as to conform to a global system for mobile communication association (GSMA) standard.

* * * * *